(12) United States Patent
Short

(10) Patent No.: US 12,525,856 B1
(45) Date of Patent: Jan. 13, 2026

(54) AUTOMATED MAINTENANCE ROTATION MOTOR OPERATOR SYSTEM AND MACHINE

(71) Applicant: Jeffrey Aaron Short, Alabaster, AL (US)

(72) Inventor: Jeffrey Aaron Short, Alabaster, AL (US)

( * ) Notice: Subject to any disclaimer, the term of this patent is extended or adjusted under 35 U.S.C. 154(b) by 0 days.

(21) Appl. No.: 18/823,004

(22) Filed: Sep. 3, 2024

(51) Int. Cl.
| | |
|---|---|
| *H02K 11/38* | (2016.01) |
| *F16H 1/16* | (2006.01) |
| *F16H 57/023* | (2012.01) |
| *F16H 57/039* | (2012.01) |
| *H02K 7/116* | (2006.01) |
| *F16H 57/02* | (2012.01) |

(52) U.S. Cl.
CPC .............. *H02K 11/38* (2016.01); *F16H 1/16* (2013.01); *F16H 57/023* (2013.01); *F16H 57/039* (2013.01); *H02K 7/1166* (2013.01); *F16H 2057/02034* (2013.01); *F16H 2057/02073* (2013.01)

(58) Field of Classification Search
CPC .................................. F16H 1/16; H02K 11/38
See application file for complete search history.

(56) References Cited

U.S. PATENT DOCUMENTS

| | | |
|---|---|---|
| 7,235,965 B2 | 6/2007 | Abe et al. |
| 10,291,175 B2 | 5/2019 | Matsubara |
| 2011/0204836 A1 | 8/2011 | Kling |
| 2022/0187166 A1 | 6/2022 | Chastagnier |

FOREIGN PATENT DOCUMENTS

| | | | | |
|---|---|---|---|---|
| DE | 102005063000 A1 | * | 7/2007 | ........... A47C 20/041 |
| WO | WO-2015141928 A1 | * | 9/2015 | ............... F16H 1/16 |

OTHER PUBLICATIONS

Machine translation of DE102005063000. (Year: 2005).*
Machine translation of WO2015141928. (Year: 2015).*

* cited by examiner

*Primary Examiner* — Randell J Krug
(74) *Attorney, Agent, or Firm* — Christopher R. Ganter, LLC

(57) ABSTRACT

A motor rotation unit and system that rotates a stored electrical motor's shaft to avoid false brinelling, damage to rotors and bearings and keeping lubrication inside the motor distributed between the internal bearings and rotors. The motor rotation unit is attachable to a motor shaft and is programmed to rotate around the shaft at a pre-determined time, duration and a programmed degree and distance of rotation of the motor rotation unit. Once the motor rotation unit cycles, the weight of the motor rotation unit uses gravity to rotate the stored electrical motor shaft such that the bottom of the motor rotation unit returns parallel to a ground surface.

24 Claims, 15 Drawing Sheets

AUTOMATED MAINTENANCE ROTATION MOTOR OPERATOR SYSTEM AND MACHINE

FIELD OF THE INVENTION

The present invention relates to a machine and system that rotates the shafts of large electric motors that are kept in storage for use when an existing used motor fails. These motors are designed to operate various systems in a variety of industrial type settings and industries. The present invention rotates an electrical motor an incremental amount at a pre-determined time so that the integrity of the motor's rotors contained within the motor is maintained and are not damaged due to the large weight exerted on them because of the inherit size and weight of the motor itself and the lack of rotation of the motor windings and rotors during storage.

BACKGROUND OF THE INVENTION

In an industrial setting, it is common for spare equipment to be stored on a stand-by basis so that if there is equipment failure, the spare equipment can be substituted for the failed equipment thereby reducing lost time or manufacturing productivity that could be caused by having to source a piece of equipment and wait for long periods of time to receive said equipment. In one example, large electric motors are stored as spares in case an existing operating motor fails. The storage of a large electric motor with anti-friction bearings creates several concerns or issues that an operator or facility must address. Some of these concerns include false brinelling, lubricant separation, lubrication film failure, among other concerns. With regards to false brinelling, when equipment shafts are stationary, point loading is confined to the same bearing contact area. This loading is multiplied by the accelerations associated with vibrations and longitudinal movements normally found in transportation, storage, and industrial environments. Over a period of time, this vibration-amplified point loading results in false brinelling (unintentional and excessive metal hardening) at the contact area with an associated depression in the metal at the contact area. When the equipment is brought on line, the over-hardened spot either pops out of the parent metal or the depression damages other bearing components on each revolution. In either case, bearing failure is accelerated. Rotating the bearings with some frequency interrupts the false brinelling. With regards to lubricant separation, the grease commonly used in anti-friction bearings consists of oil that is mixed with a soap to form a solid. However, if the mixture is allowed to stand stagnant over time, as in a stationary bearing, the oil and soap tend to separate. When the equipment is brought on line, the oil/base separation results in inadequate lubrication, leading to premature bearing failure. Rotating the bearings with some frequency maintains the oil/soap mixture. With regards to lubrication film failure, when anti-friction bearings sit in the same position over a period of time, the original lubrication film that separated the rolling member from the race is squeezed out. This same film protects the polished steel components from moisture, and when lost, corrosion results. When equipment is brought on line, the bearing suffers immediate and irreparable damage until the lubrication film can be reestablished. Even when reestablished, the lubricant picks up the particles of damaged metal, along with any corrosive particles, and forms a grinding paste, accelerating bearing failure. Rotating the bearings with some frequency maintains the protective film.

Rotation of stored motors is an industry standard recommendation. In short, the bearings benefit from rotation to recoat the various bearing parts with oil, and the bearing benefits structurally by allowing the rollers to rest in varying locations during storage. In larger motors it is also important to prevent warping/bowing/sagging of the rotor. The recommendations vary, but is pretty well universally recommended to rotate motors being stored for long durations. Rotating the shaft adjusts the position of the shaft relative to the bearing so it's not in the same spot for days and weeks on end. Shaft rotation also prevents rotor sag. Rotors are heavy and only suspended by the bearings. Long-term storage can lead to the rotor bowing or sagging and may result in a rotor to stator rub when placed in service. What is needed in the art is a motor rotation unit and system that allows automated motor shaft rotation of a plurality of stored motors. The Maintenance Rotation Motor Operator (hereinafter referred to as the "MRMO") is designed to automatically rotate the rotor of a stored, disconnected AC motor to prevent bearing damage. This rotation is suggested by most major motor manufacturers at least every three months, and as often as every month or more. Manufacturers recommend at least 90 degrees of rotation to ensure that the bearings do not rest in the same location for extended periods of time.

SUMMARY OF THE INVENTION

The motor rotation unit is designed to be attachable to a motor shaft on a motor in storage. The motor rotation unit through a motor and gear driven system can rotate around the shaft of a stored motor such that at a certain point of rotation the motor rotation unit by its own weight can cause the stored motor shaft to rotate. Once a desired amount of rotational climb by the motor unit around the motor shaft starting from a bottom oriented position, the weight of motor rotational unit causes the electric motor shaft to rotate a set amount of degrees whereby the motor rotation unit by means of gravity comes back to rest at a bottom, lower, south and six o'clock position. The motor rotation unit creates this movement using a gear motor that rotates a worm gear that rotates a ring gear that is attached to the motor shaft. This gear motor is controlled by an electronic control module which provides the power and timing to start the motor rotation unit as well as to record the amount of rotation achieved. The rotation is measured using a limit switch that creates pulses for each tooth of the ring gear that passes the switch. The information related to the degree of rotation of the motor shaft and the date and timing is logged into the control module and in one embodiment can be sent to a database whether it be internal in the control module, the individual motor rotation unit or via internet and internet cloud based connection. Furthermore, one control module unit can control a plurality of motor operational units in sequence that are installed onto a plurality of motors that are in storage.

DETAILED DESCRIPTION

Figure 1:
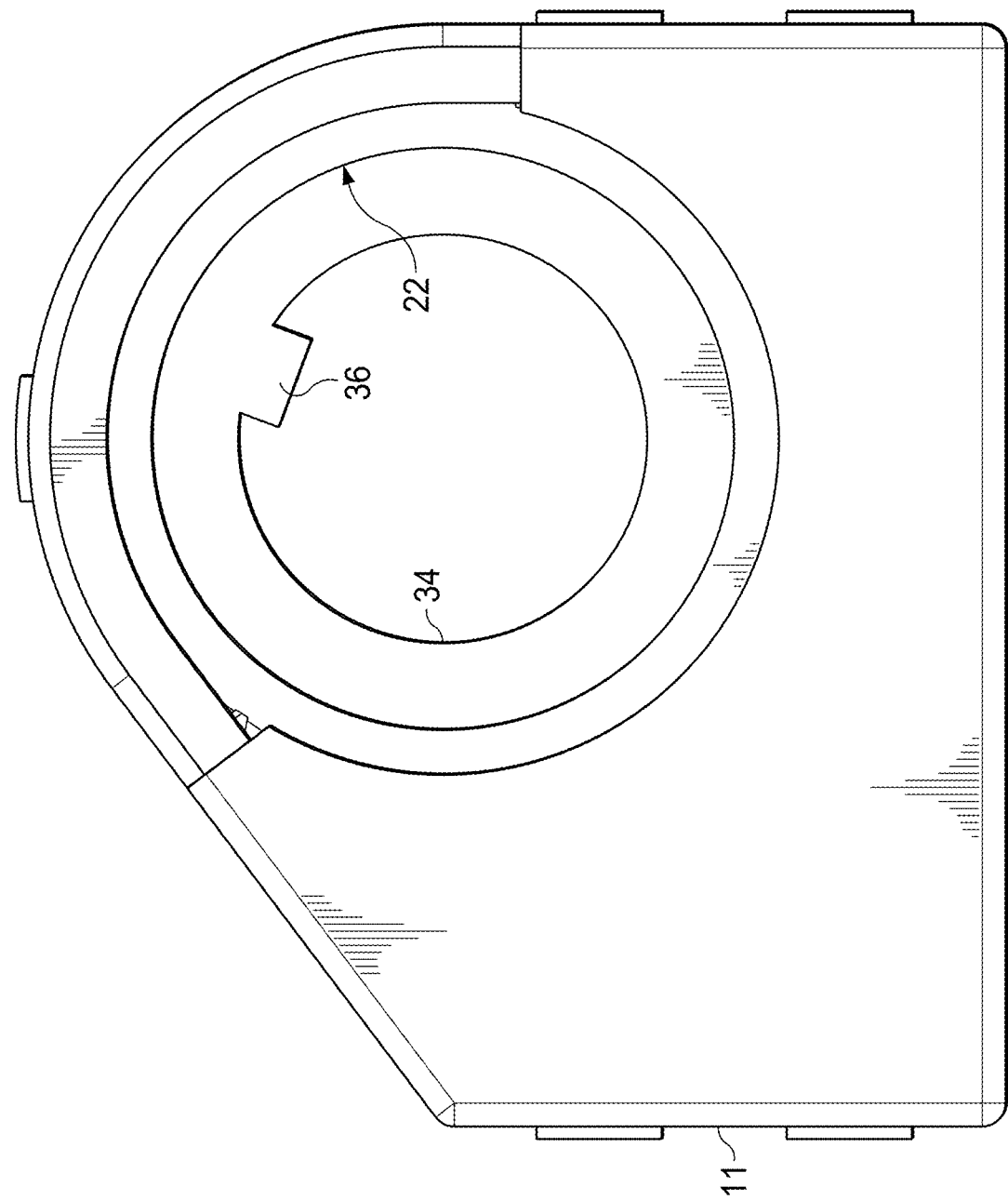
FIG. 1 is a front plan view of the motor rotation unit.
Figure 2:
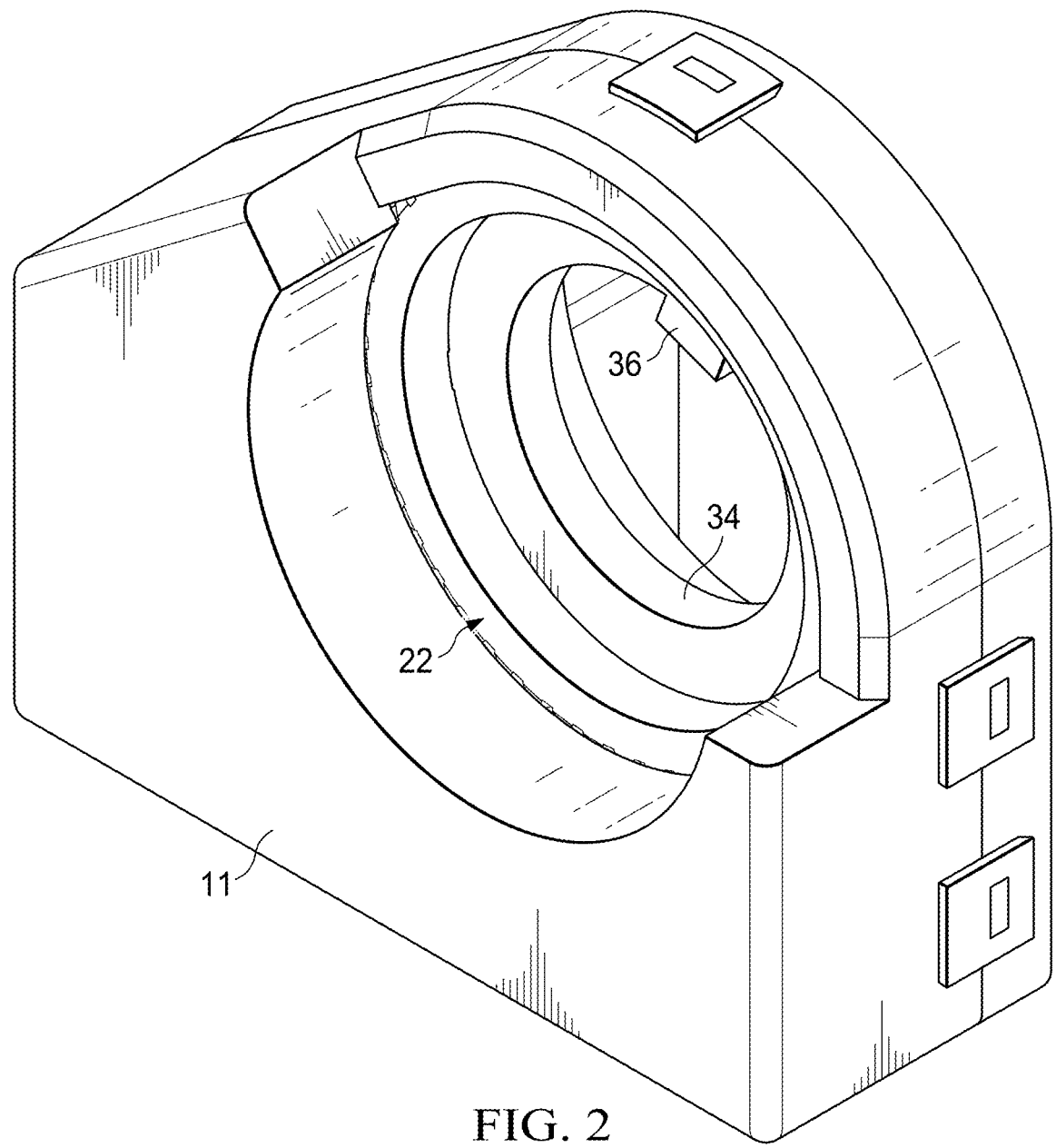
FIG. 2 is a front perspective view of the motor rotation unit.
Figure 3:
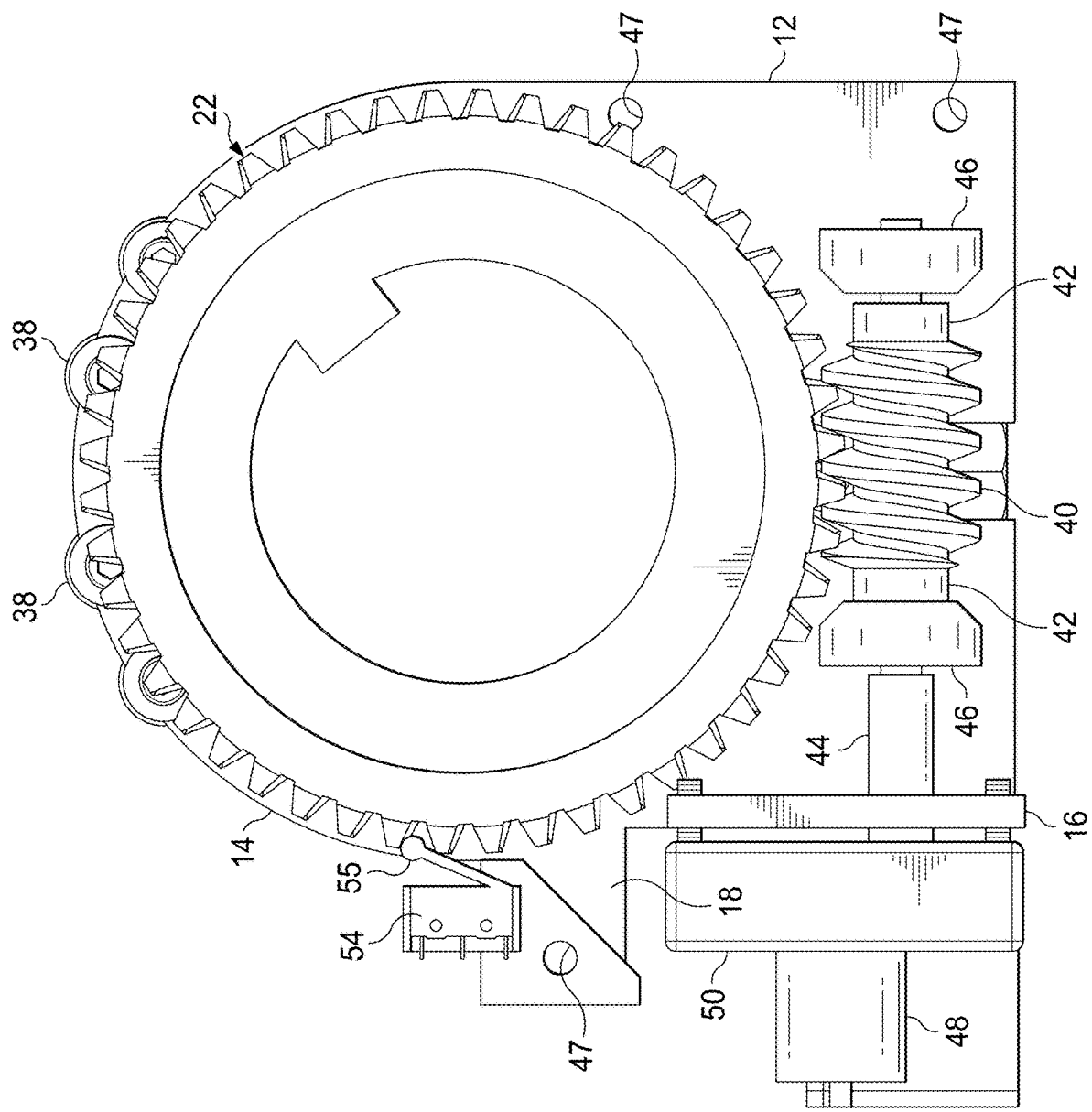
FIG. 3 is a front plan view of the motor rotation unit without its protective case and showing internal parts.
Figure 4:
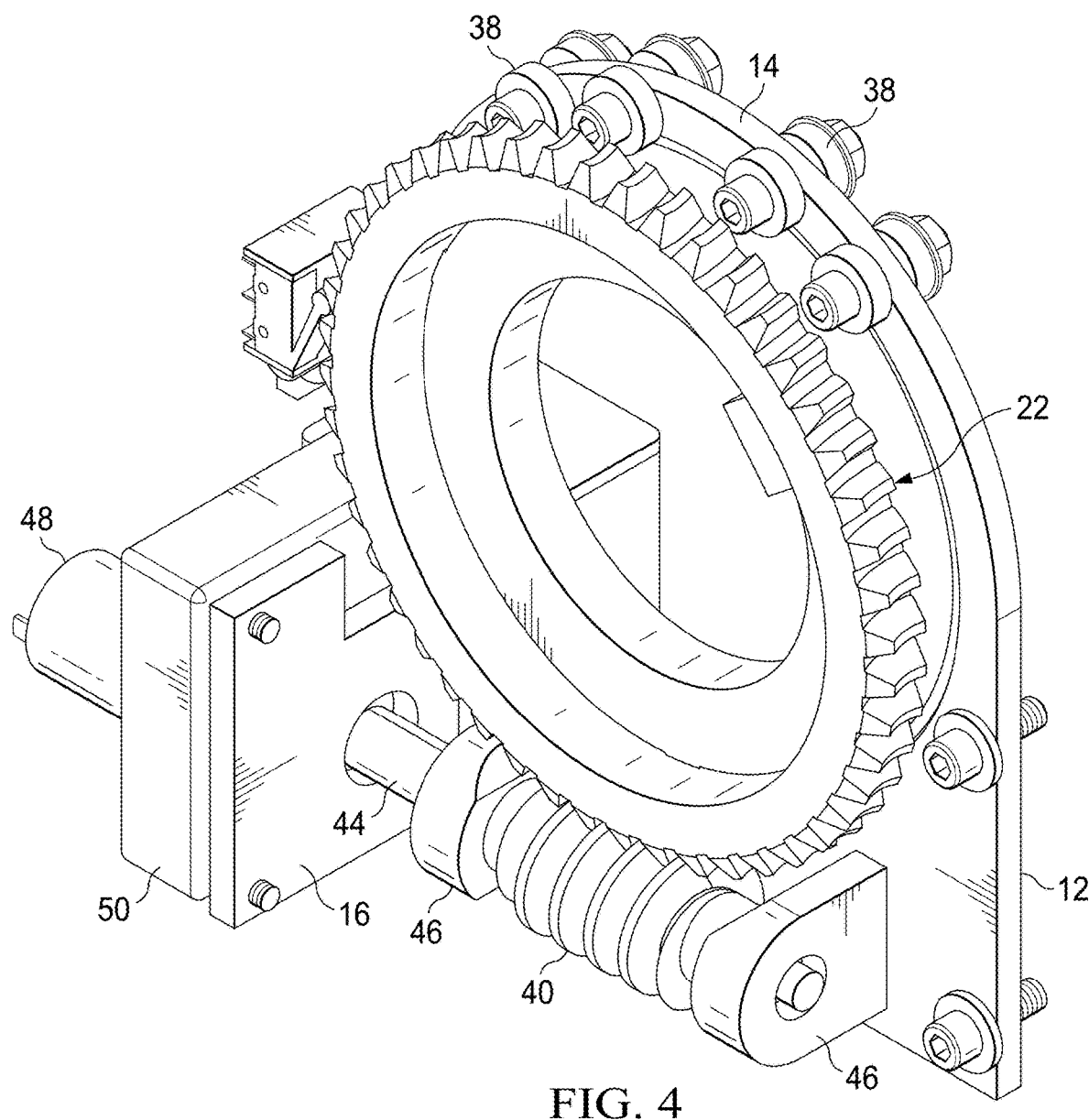
FIG. 4 is a front perspective view of the motor rotation unit without its protective case and showing internal parts.

Referring now to FIGS. 1-4, there is shown in FIGS. 1-2 the motor rotational unit 10 ("hereinafter interchangeably referred to as the "motor unit" in the specification) with its protective case 11 installed. The protective case 11 protects the internal parts of the motor rotational unit 10 from the deposit of foreign materials and any other type physical damage to the internal parts of the motor rotation unit due including moisture and corrosion. Also shown in FIGS. 1-2 is an adapter ring 34 with an adapter key 36 that is interchangeable with other adapter rings 34 and adapter keys 36 that are suited for a particular diameter motor shaft and key of a stored electrical motor. The adapter ring 34 is received into a ring gear 22 as discussed immediately below. Referring now to FIGS. 3 and 4 there is shown the internal mechanical parts or elements which make up the functional portion of the motor rotation unit 10. The motor rotation unit 10 is incorporated around a metal chasis 12 made of a material that has enough weight and rigidity that by its own weight and the components attached thereto and discussed below will overcome the motor shaft rotational resistance and turn the shaft a determined amount of rotational degrees back to the six o'clock position or where the motor rotation unit 10 bottom surface is parallel with the ground. The chassis 12 is also adapted to receive additional weights attached to the bottom of the chassis 12 via a mount or mounting holes for attachment of additional weights. Additional weights are helpful to help compensate the motor rotation unit 10 when the weight of the motor rotation unit 10 does not weight enough to turn very large stored electrical motors 62. The motor rotation unit 10 and its weight along with any other additional attached weights are designed to be a counterweight such that a stored electrical motor 62 shaft can be turned as the motor rotation unit 10 advances around the stored electrical motor 62 shaft. Additionally, there is shown in FIG. 3 a front perpendicular vertical plate 16 located on the left side of the motor unit 10 metal chassis 12. Also shown is a gear box 50 attached to said front perpendicular vertical plate 16 and rear perpendicular vertical plate 18 and also a motor 48 installed and attached to said gear box 50. There is also shown a shaft insert 52 that joins to the motor 48 shaft. Further shown is a worm gear 40 that is held in place by worm gear mount plates 46 that are vertical and perpendicular and located in the bottom region of the metal chassis 12. These worm gear mount plates 46 are parallel to each other and have apertures located through their sides which allows a worm gear shaft 44 to be inserted through the worm gear mount plates 46 and through the worm gear 40 along with worm gear bearings 42 located on each side of the worm gear 40 but encapsulated by the worm gear mount plates 46. There is a shaft insert 52 that joins the worm gear shaft 44 to the motor 48 shaft. In one embodiment the worm gear plates 46 are installed onto the metal chassis 12 via threaded holes in the worm gear plates 46 on their rear face where they meet with apertures 47 located in the bottom region of the metal chassis 12 and whereby fasteners inserted through the back side of the metal chassis 12 and into the worm gear plates 46 threaded holes allows the plates 46 to be in firm connection with the metal chassis 12. The worm gear 40 comprises a shaft with a spiral thread that engages with and drives the ring gear 22 teeth 26 as the motor 48 drives the worm gear 40. There are further apertures 47 located around the perimeter of the metal chassis 12 that accept bolts 72 and that terminate into threaded apertures 74 located in the rear portion of the case 11 such that the metal chassis 12 can be firmly attached to the case.

Figure 5:
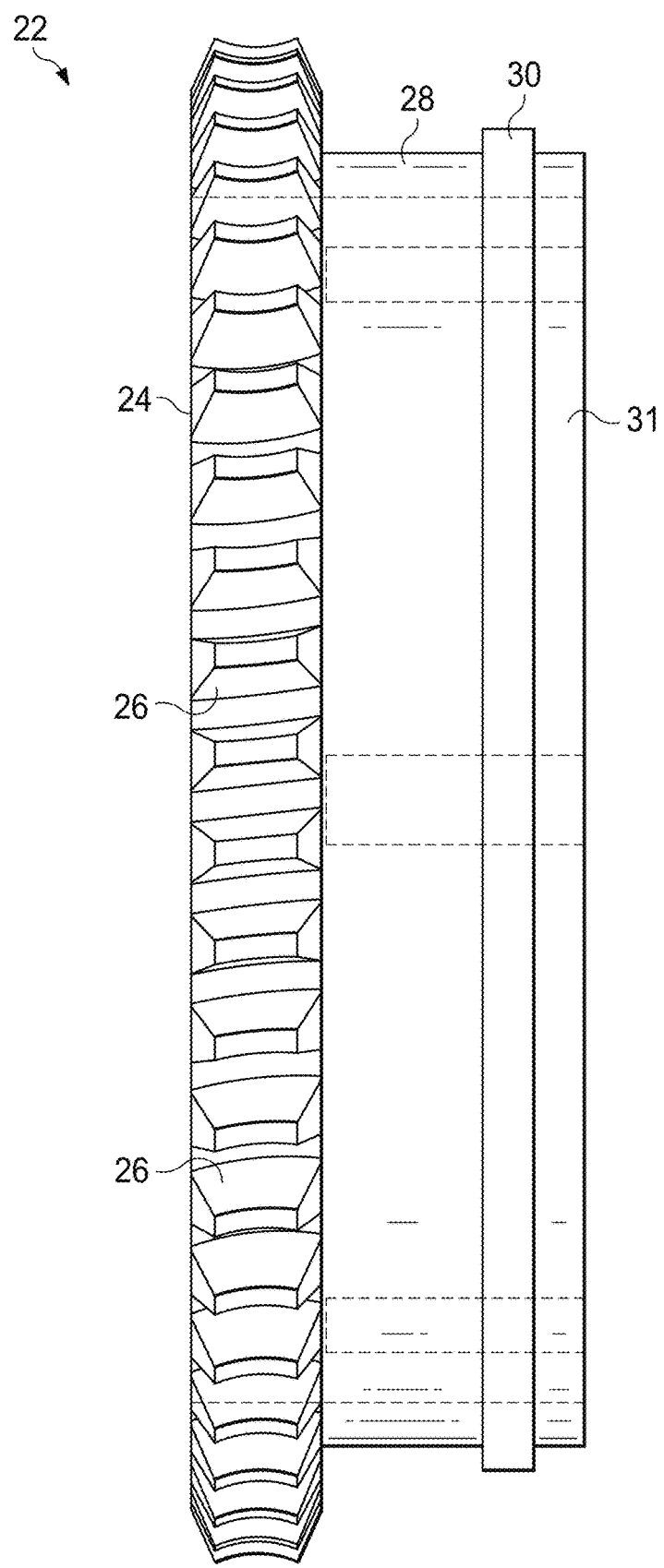
FIG. 5 is a side elevation of the ring gear.

Referring now to FIGS. 4-5 there is shown the ring gear 22 having a ring gear portion with teeth 26 located along side its outer edge, a front track 28, a lip 30, and a rear track 31. Each tooth 26 of the ring gear 22 has a concave outer surface to allow a limit switch toggle arm 55 to smoothly climb and traverse and descend on each ring gear 22 tooth 26. The ring gear 22 is installed into the central opening 13 of the metal chassis 12. To secure the ring gear 22 into the central opening 13 of the metal chassis 12, there are a plurality of apertures 15 located in the metal chassis 12 in the upper region of the annular portion 14 of the metal chassis 12. Further, there is an aperture 15 located in the bottom region of the metal chassis 12 in approximately the six o'clock position. Said apertures 15 are purposed to receive roller bearings 38. The ring gear 22 is inserted into the metal chassis 12 central opening 13, and then subsequently roller bearings 38 are installed onto bolts whereby those bolts are installed in a position where the roller bearings 38 are in contact with the front track 28 of the ring gear and then the bolts inserted through the metal chassis 12 apertures 15 such that the bolts pass over the lip 30 of the ring gear. On the rear side of the metal chassis 12, an additional roller bearing 38 is installed onto each of said bolts such that the roller bearings 38 located on the rear side of the metal chassis 12 such the roller bearings 38 come to rest on the rear track 31 of the ring gear. A nut is threaded onto each bolt such that the ring gear 22 lip 30 traps and/or captures the ring gear 22 inside the central opening of the metal chassis 12. The ring gear 22 can rotate within the central opening 13 of the metal chassis 12 due to the contact between the roller bearings 38 contact with the front track 28 of the ring gear 22 and the rear track 31 of the ring gear 22. When the motor 48 is actuated, it turns the worm gear 40 which the spiral threads of the worm gear 40 are engaged with the teeth 26 of the ring gear 22 and rotates the ring gear around the central opening 13 of the metal chassis 12.

Figure 6:
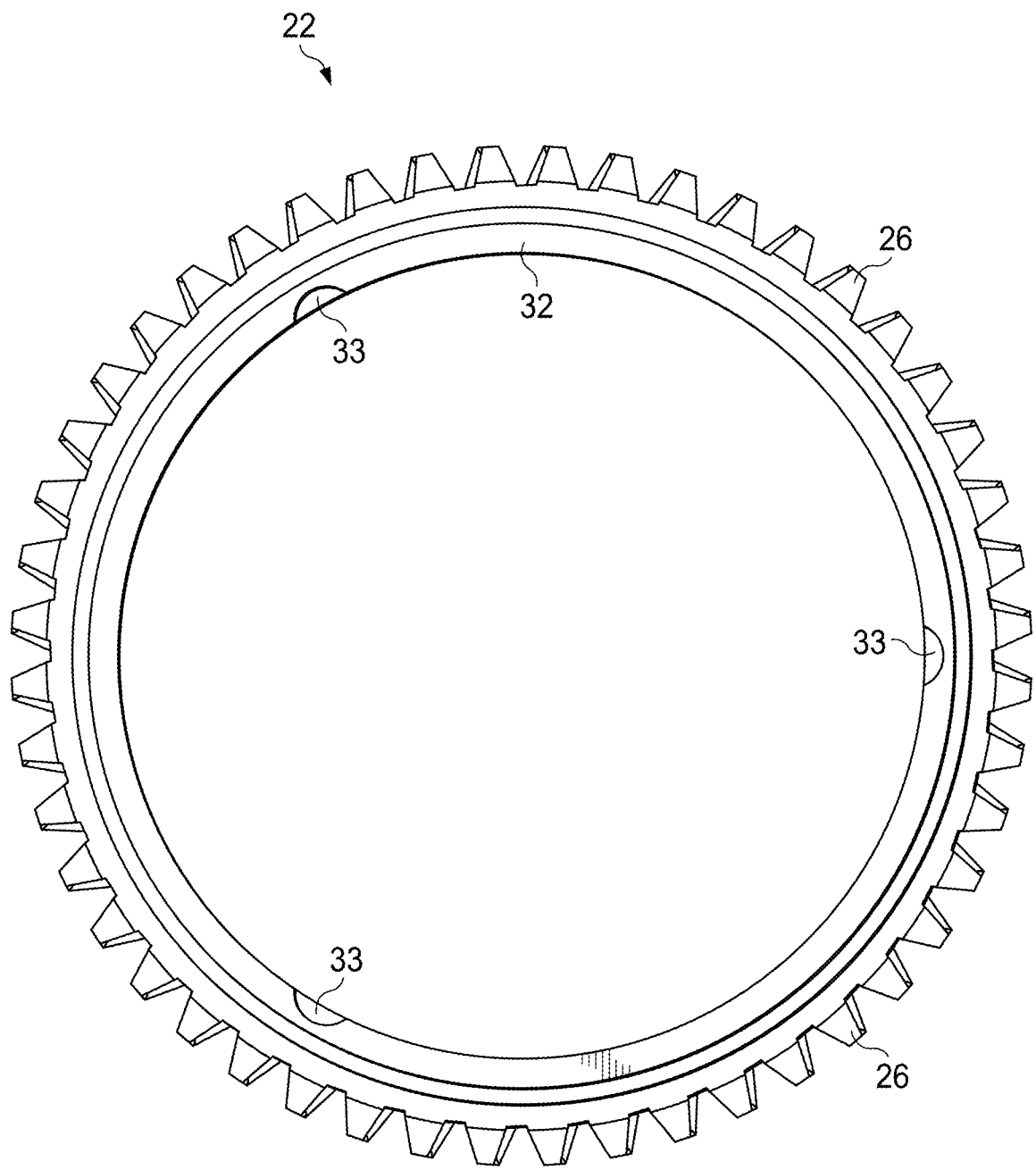
FIG. 6 is a bottom plan view of the ring gear.
Figure 7:
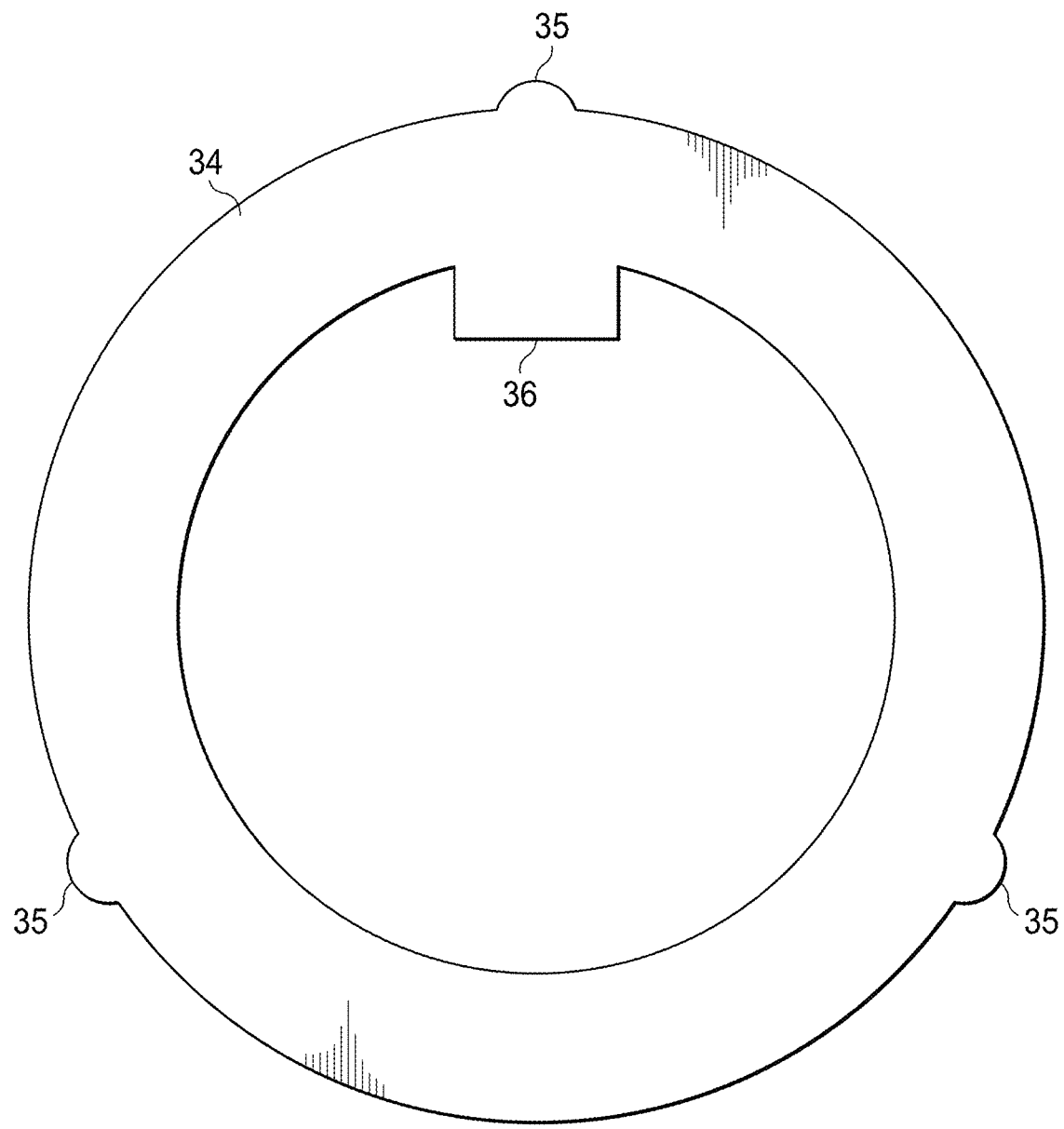
FIG. 7 is a top plan view of shaft adapter.

Referring now to FIGS. 6-7 there is shown a rear elevation of the ring gear 22 whereby there is shown the inner surface 32 of the ring gear and slots 33 located in the inner surface 32. The slots 33 are purposed to receive a shaft adapter 34 which is designed particularly for the electrical Alternating Current stored motor 62 that is in storage. The shaft of the stored motor 62 has a particular key or groove along the length of its shaft such that it can be installed into a desired mechanical system and be rigidly attached into said system. The shaft adapter 34 has a plurality of knobs 35 located along its outer edge. The knobs 35 allow the shaft adapter 34 to be installed into the rear of the ring gear 22 whereby the knobs 35 align with predetermined slots 33 in the ring gear 22 such that the shaft adapter 34 is rotationally locked inside the ring gear 22. The shaft adapter 34 also has a shaft adapter key 36 which is installed onto a stored motor shaft 62 and said shafter adapter 34 and key 36 can be designed and manufactured to meet any size requirements and key type of a given stored motor 62.

Figure 8:
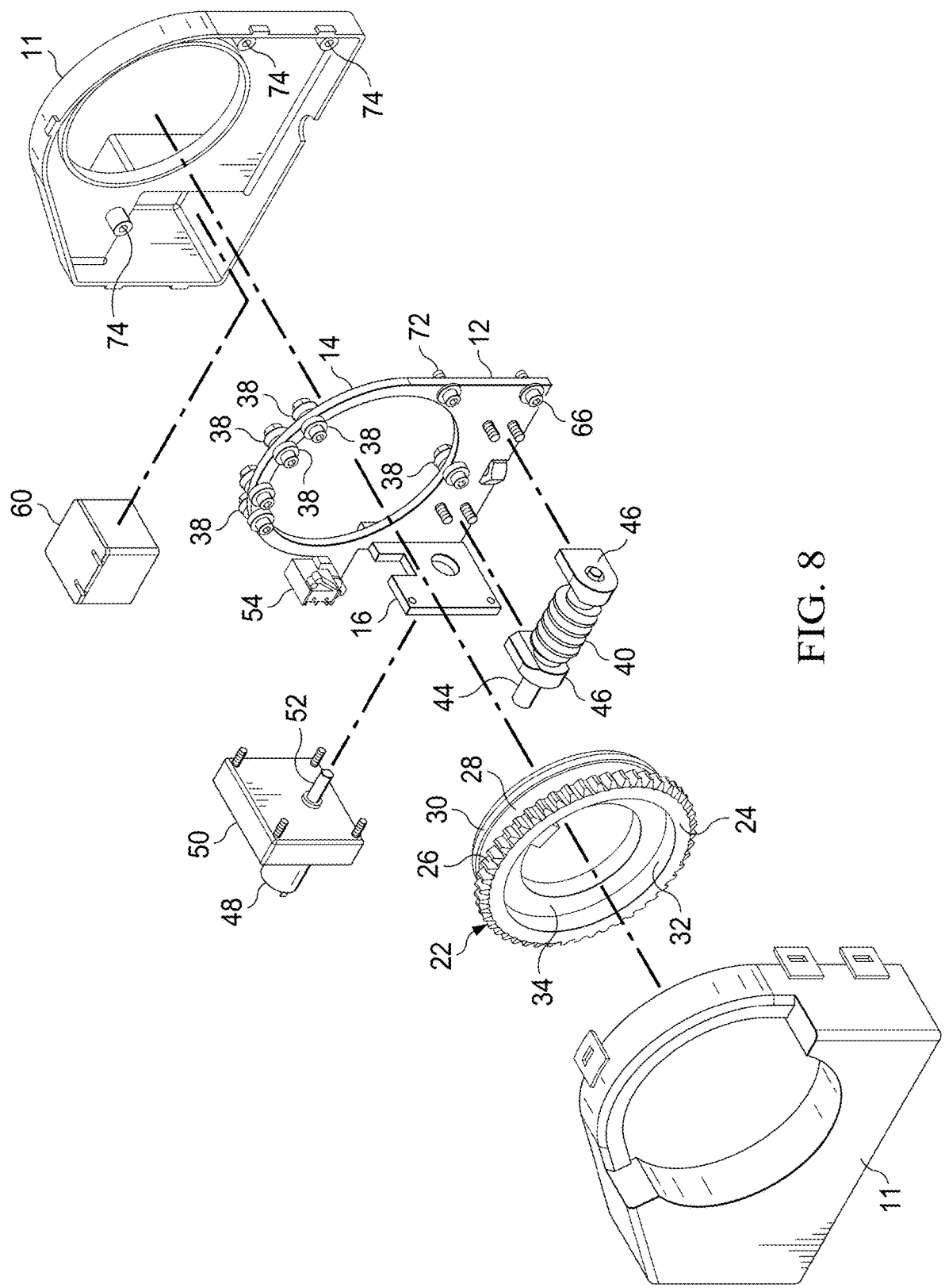
FIG. 8 is a front perspective partially exploded view of the motor rotation unit.
Figure 9:
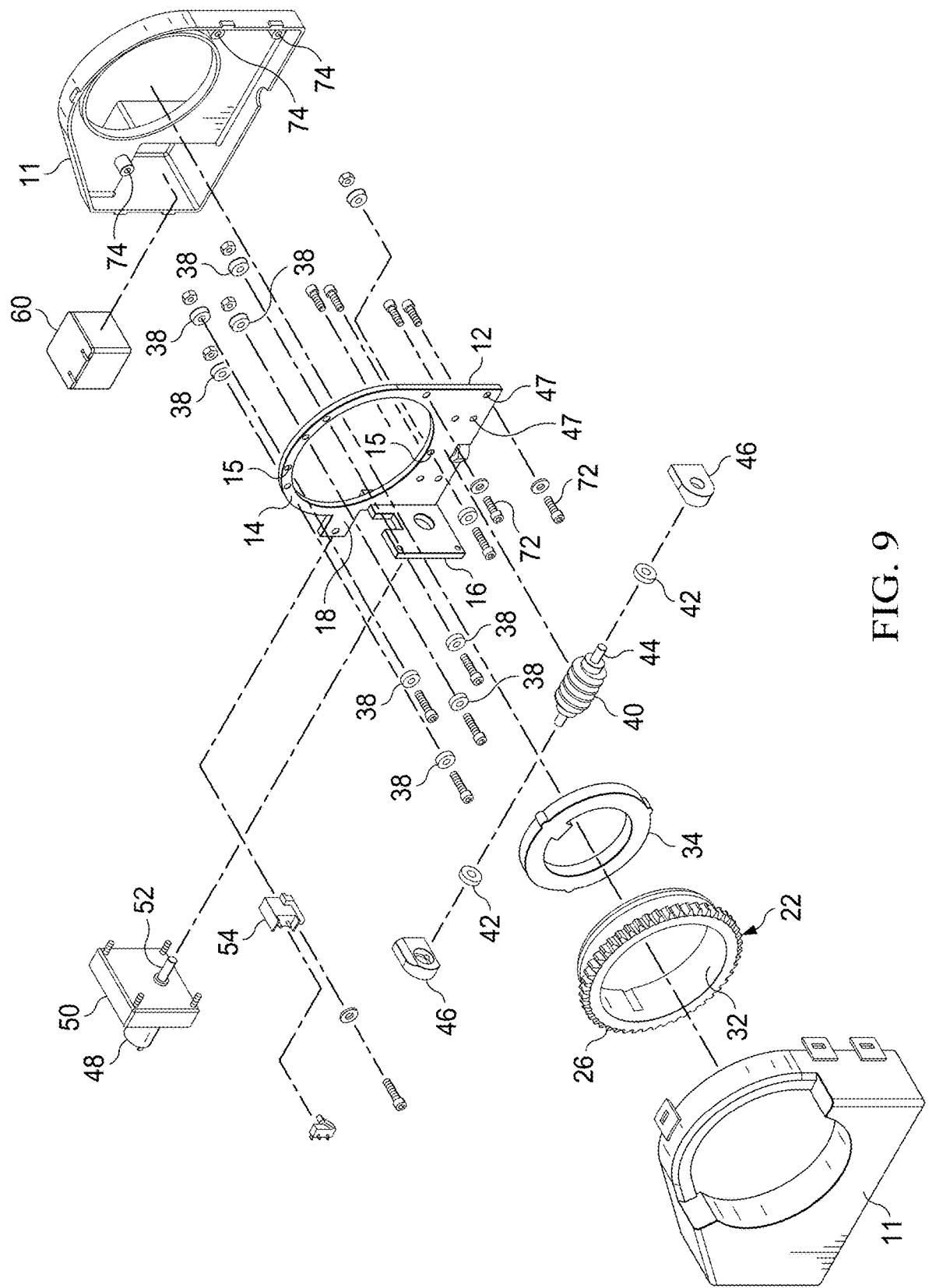
FIG. 9 is a front perspective exploded view of the motor rotation unit.
Figure 10:
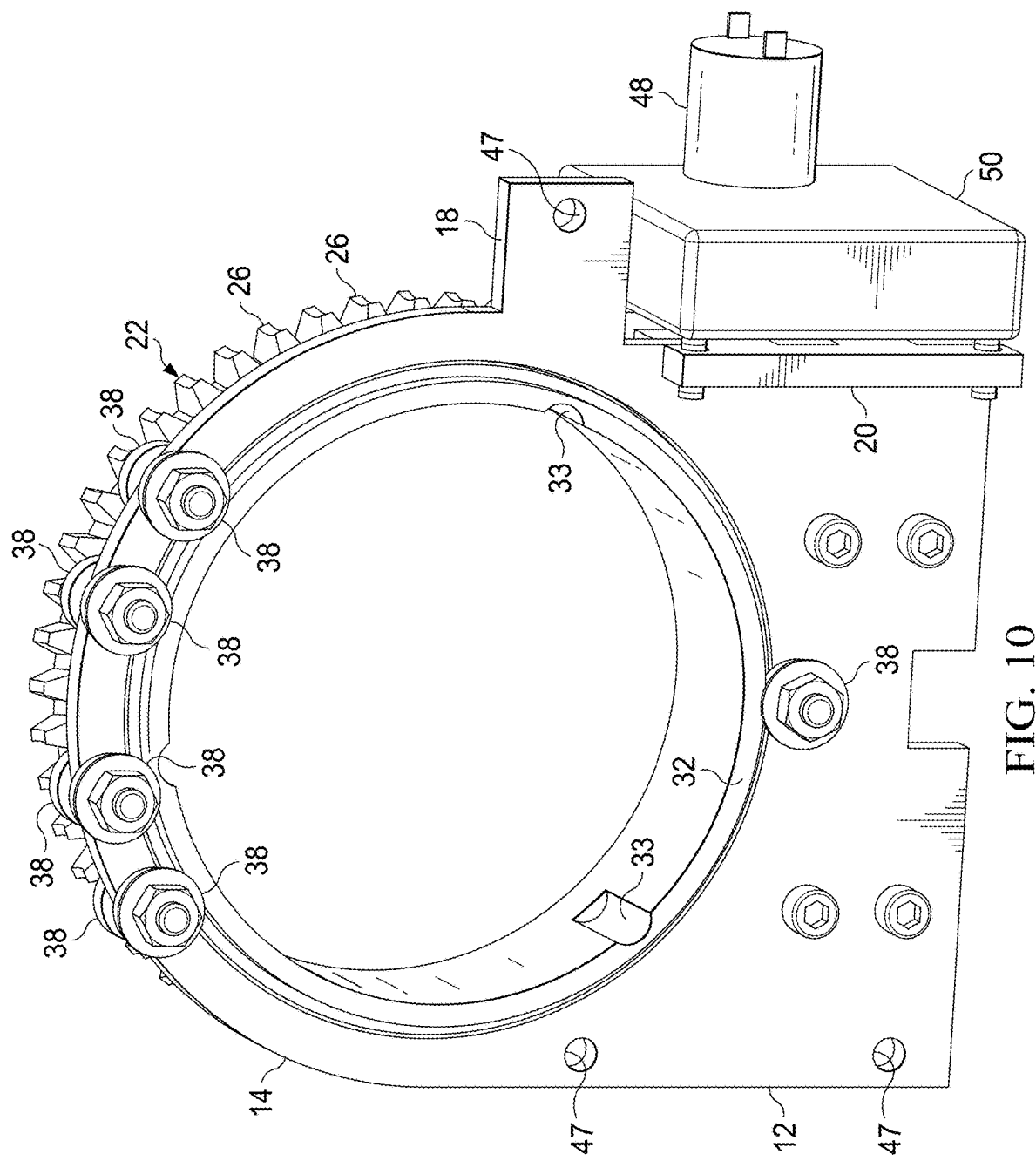
FIG. 10 is a rear perspective view of the motor rotation unit.
Figure 11:
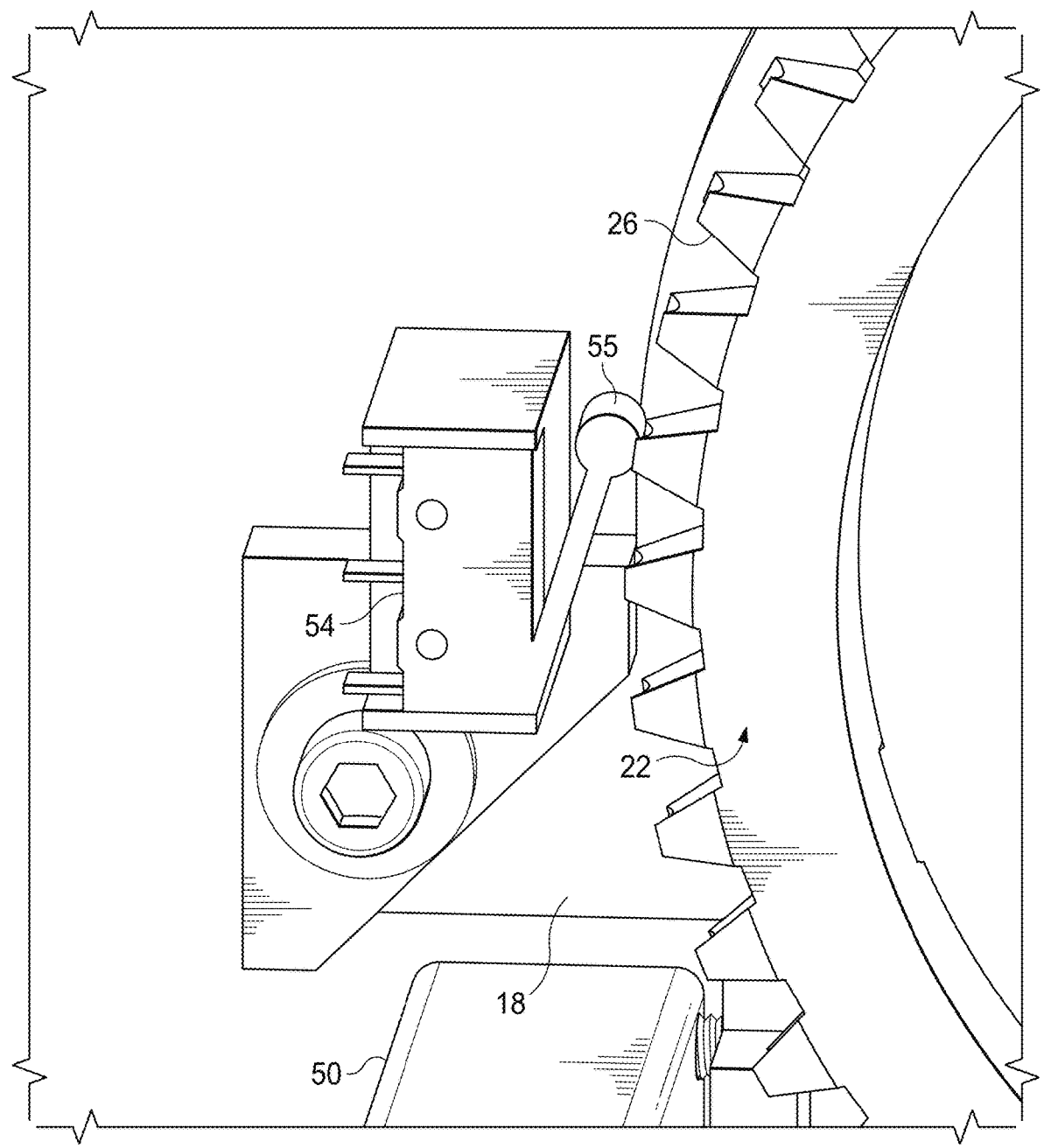
FIG. 11 is a magnified view of the limit switch in contact with the teeth of the gear ring unit.

Referring now to FIGS. 8-9 there is shown a partially exploded view of the motor rotation unit 10 containing the various components as discussed above and shows their relationship to each other and the manner in which they are interconnected and installed. The metal chassis 12 is the central feature of the invention which allows all of the other components to be installed onto and into the metal chassis 12 such that form the inventive concept of the invention. The ring gear 22 by way of the roller bearings 38 and accompanying bolts, motor 48 and gear box 50, worm gear 40, worm gear plates 46, limit switch 54 are all directly connected and installable onto the metal chassis 12 such that when combined they all work in cooperation and unison to achieve the goal of efficiently and automatically rotating a stored motor.

Figure 12:
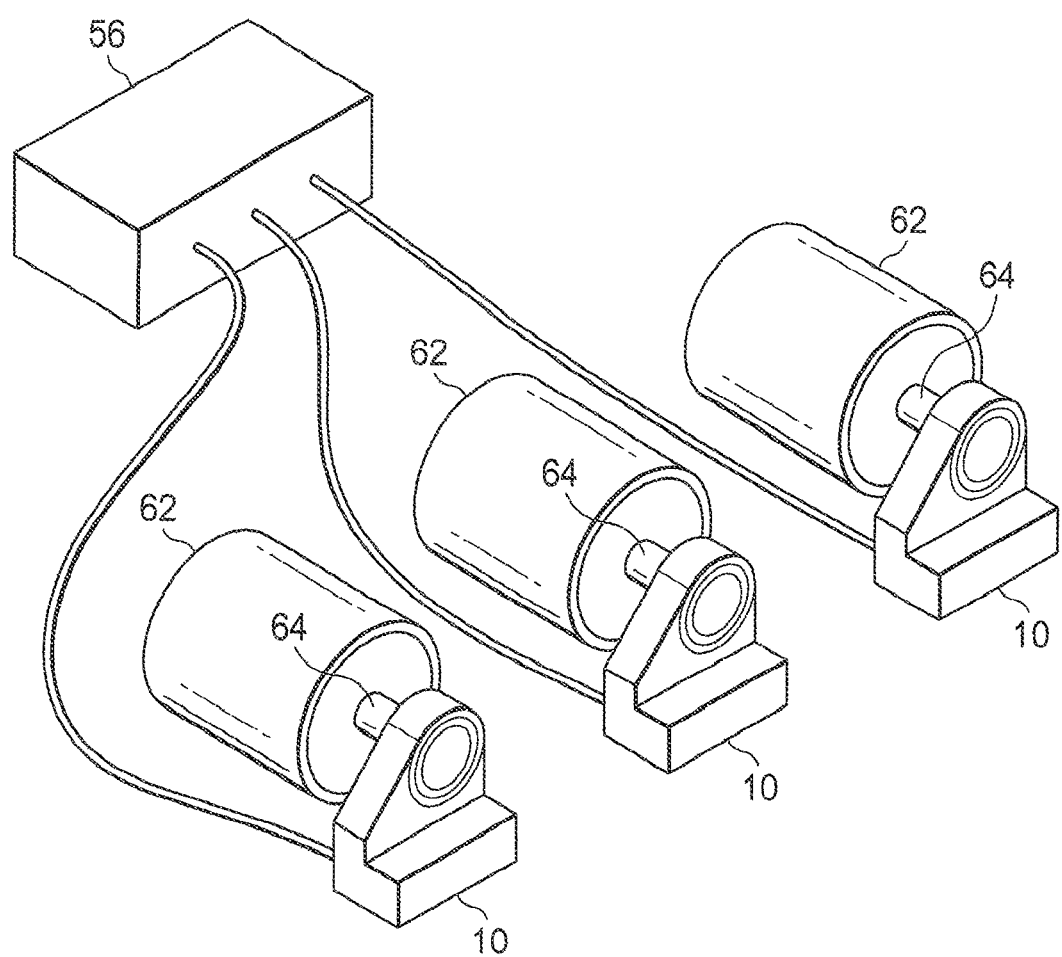
FIG. 12 is a perspective overview of the control module linked up to a group of motor rotation units that are installed on a plurality of AC motors.
Figure 13:
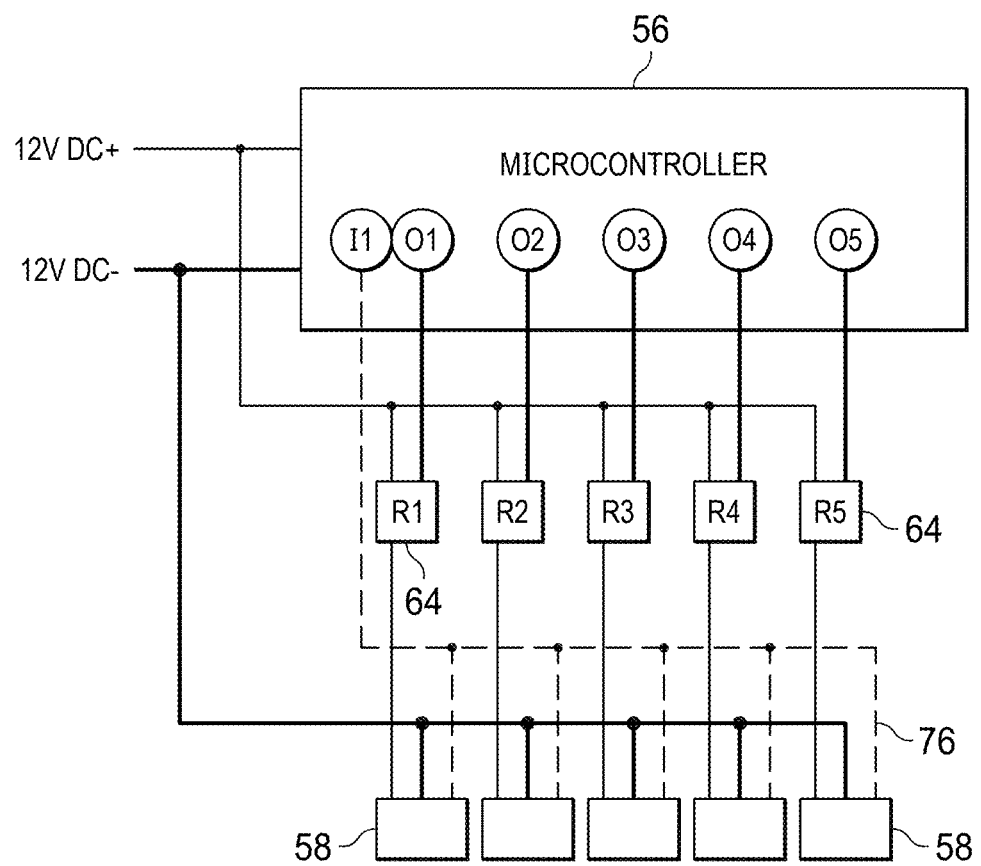
FIG. 13 is an electrical schematic for the control module.
Figure 14:
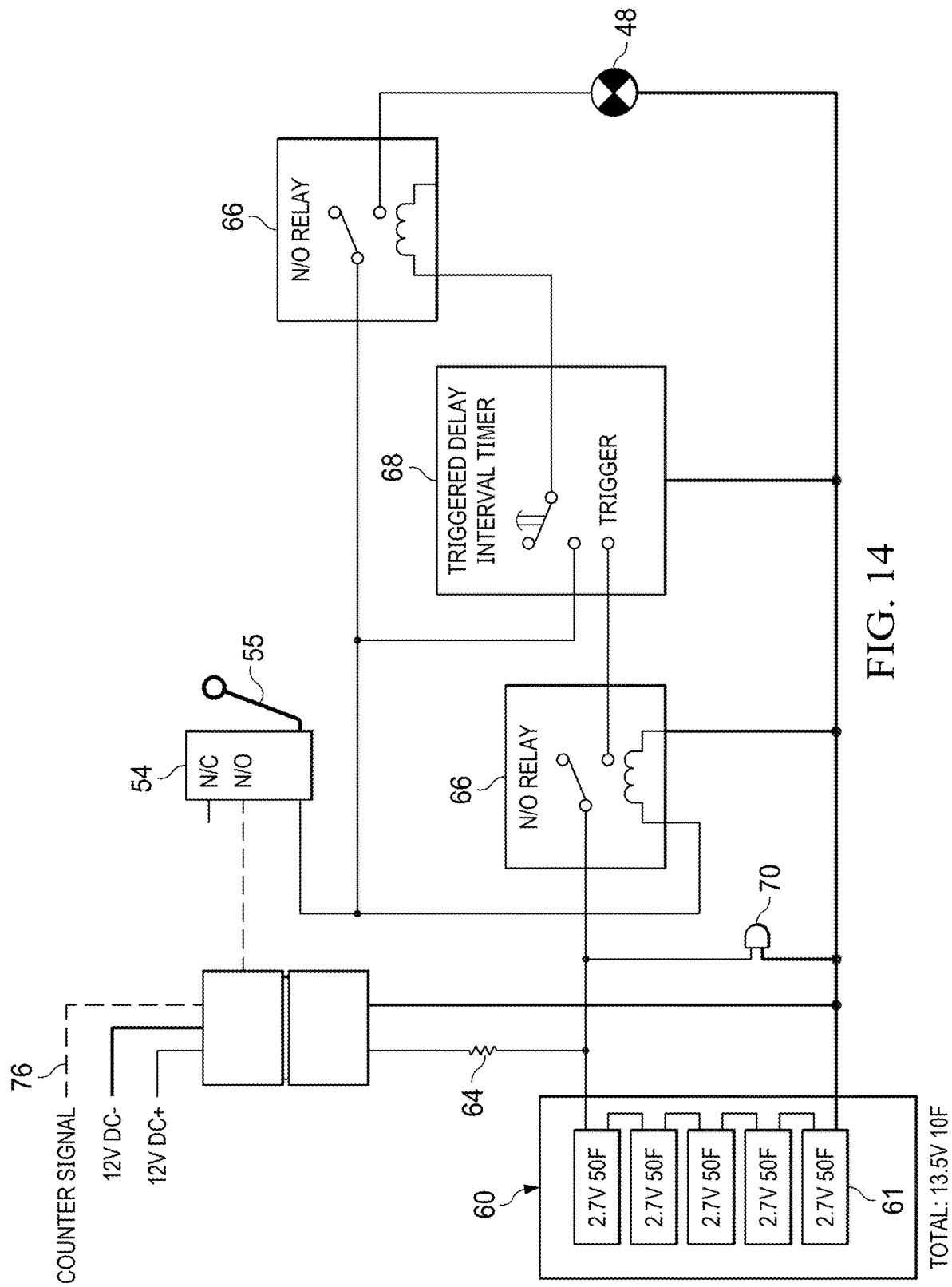
FIG. 14 is an electrical schematic for the motor rotational unit.
Figure 15:
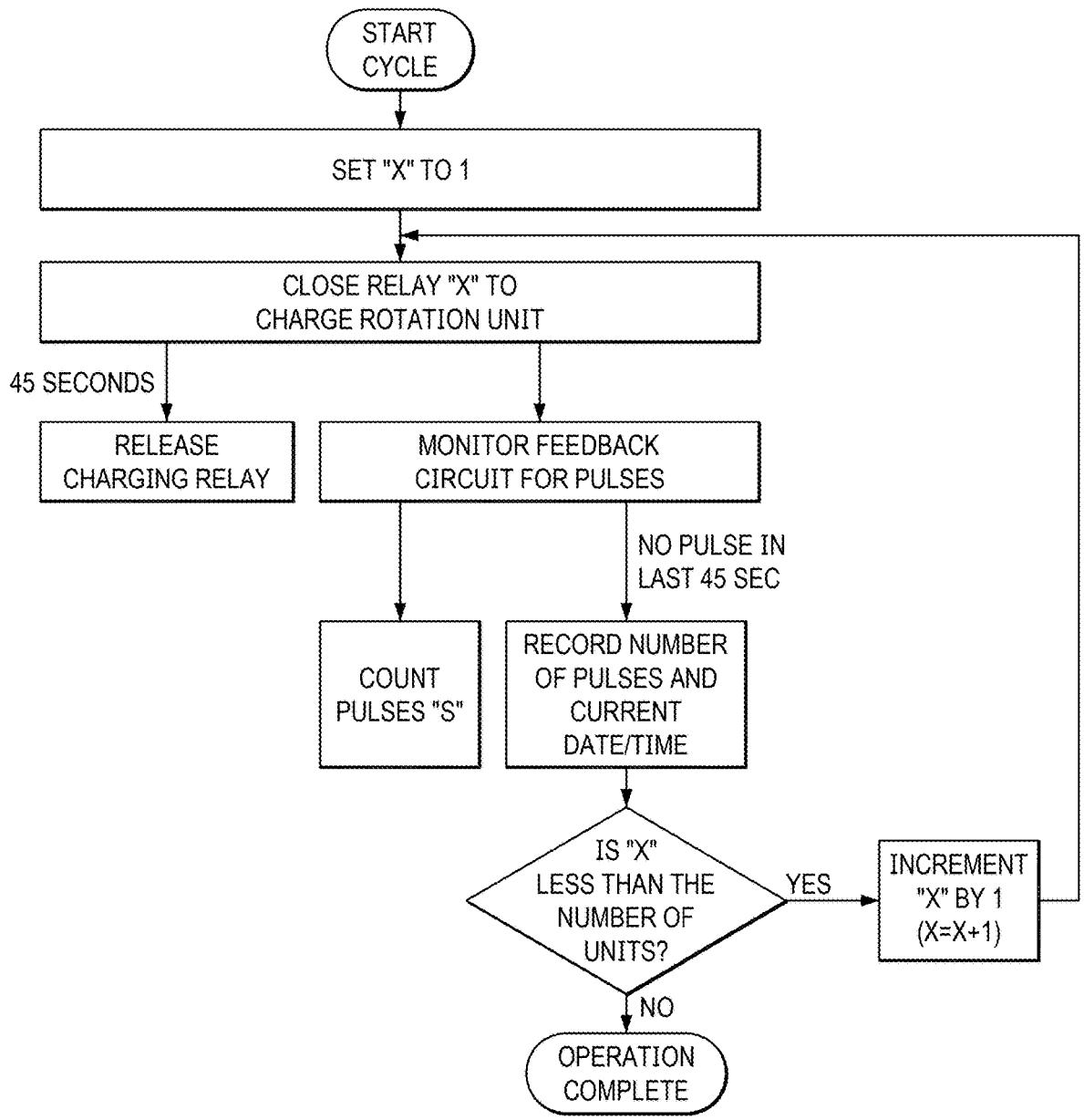
FIG. 15 is a flowchart showing the logic for the control module's microcontroller and motor rotational unit.

The motor rotation unit 10 is designed to automatically rotate the rotor of a stored, disconnected AC motor to prevent bearing damage. This rotation is suggested by most major motor manufacturers at least every three months, and as often as every month. Manufacturers recommend at least 90 degrees of rotation to ensure the bearings do not rest in the same location for extended periods of time. In a preferred embodiment, a rotation degree of 150 degrees is desired as it puts the shaft at multiple different positions over time Referring now to FIGS. 13-15, the system comprises a motor rotation unit 10 and control module 56. One motor rotation unit 10 is needed for each motor to be maintained and multiple motor rotation units 10 can be controlled by a single control module 56. The control module 56 is connected to each motor rotation unit 10 via a wired power data connector 58, with quick connects at both the control module 56 and the motor rotation unit 10. The wired power data connector 58 supplies power to the motor rotation unit 10 and rotation data back to the control module for storage and/or remote reporting to a central computer application for recordation. The control module 56 contains a microcontroller that commands relays 66 for charging each motor rotation unit 10 and receives the counts back from the limit switch 54 in the motor rotation unit 10 that indicates rotational movement as the limit switch 54 rides up and down each tooth of the ring gear 22. The control module 56 will count these pulses and record the count as a number of degrees of rotation. Referring to FIG. 15, there is shown a flowchart of the logic by which the control module 56 and the electrical system work in unison and the pulse counting by the control module 65 communicated by the limit switch 54. The motor control module 56 can operate the motor rotation units 10 attached to it in a sequential method, with each motor rotation unit 10 charging, rotating, and stopping before the rotation measurement is recorded and the next unit started. As shown in FIG. 12, the control module 56 is to be in a fixed location where motors are to be stored. Individual cables will attach the control module 56 to each motor rotation unit 10. The control module 56 will operate on 12V DC power supplied via a 120V AC to 12V DC power supply. A resistor is inserted in between the control module 54 and the wired connection to a capacitor bank 61 located in the capacitor box 60 control and deliver the correct amount of voltage to charge the capacitor bank 61. Rotation data for each operation will include the distance rotated and a timestamp communicated to the control module 54 and recorded and also in some embodiments transmitted remotely through a wired or wireless internet connection.

The motor rotation unit contains a DC gear motor 48, a limit switch 56, a worm gear 40 and a ring gear 22 set riding on roller bearings 38, a capacitor bank 60, control circuitry, and a status LED. The motor rotation unit 10 is attached to the motor to be maintained via a shaft insert 52 for the gear ring that matches the shaft and keyway size for the desired motor. The shaft insert 52 is keyed to fit the inside of the ring gear 22 to prevent slippage. The gear motor drives the worm gear 40 against the ring gear 22, rotating it in relation to the body of the motor rotation unit 10. As this rotates, the motor rotation unit 10 will be raised from directly under the motor output shaft to a position up and to one side. The weight of the motor rotation unit 10 will eventually overcome the friction and inertia of the stored motor's rotor, and gravity will draw the motor rotation unit back to a point directly below the motor shaft. This motion will continue until the motor rotation 10 unit stops driving the ring gear 22. The motor will then reach a point of stasis with the rotor having been rotated from its original orientation.

As the ring gear 22 rotates in the operation of the motor rotation unit, the limit switch is closed as each tooth of the gear ring passes it. The limit switch 56 is powered by the capacitor bank 61 and is wired back to the control module 54. By comparing the number of counts to the number of teeth on the ring gear 22, the amount of rotation can be recorded. The DC gear motor 48 is powered from the capacitor bank located in the capacitor box 60 in the motor rotation unit. At the start of an operation cycle, the charging relay 66 in the control module 56 closes, allowing the capacitor back to begin charging. Once the capacitor bank is charged enough to close the first control relay in the motor rotation unit 10, a timer 68 starts to allow the bank to achieve enough charge to rotate the desired distance. Once the timer 68 completes, a second relay 66 to the motor 48 closes and a second timer 68 starts. The second timer 68 sets the duration of the rotation, and when it completes, the second relay 66 is released and the motor 48 stops. The status LED 70 is directly connected across the capacitor bank 61 and indicates when lit that the capacitor bank 61 is charged. The status LED 70 purpose is to show charge in the capacitor bank 61 and also to discharge the capacitor bank 61 after a scheduled rotation is complete. The intent is that the majority of the time the motor rotation unit 10 contains no energy. This is the reason why a capacitor bank is a preferred option for powering the motor rotation unit 10, however, a battery or rechargeable battery is also a viable option. The control module 54 watches for counts from the limit switch 56 and determines the rotation has stopped when there are no new pulses over a set period of time. The limit switch 56 is connected to the control module via a counter signal wire 76 which transmits a signal for each pulse of the limit switch 56. The control module 54 then records the distance rotated and moves to the next motor rotation unit and starts the charging sequence. Once all attached motor rotation units 10 have been operated, the control module 56 waits for the next programmed command operation schedule. The motor rotation unit 10 could be configured in a number of different ways that someone skilled in the art would conceive such as using a different motor and gear configuration that still allows a motor rotation unit 10 to rotate around a stored motor's shaft and the weight of the motor rotation unit 10 to turn the stored motor's shaft a desired degree of rotation.

The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

ENUMERATED ELEMENTS

10 Motor Rotation unit
11 Case
12 metal chassis
13 central opening
14 Annular portion of metal chasis
15 Metal chasis apertures
16 front vertical perpendicular plate
18 Parallel plate on side of annular portion
20 rear vertical perpendicular plate
22 Ring gear
24 ring gear portion
26 teeth
28 front track
30 Ring gear lip
31 rear track
32 ring gear inner surface
33 Ring gear slot
34 Shaft adapter ring
35 shaft adapter knob
36 shaft adapter key
38 Ring gear roller bearings
40 worm gear
42 worm gear bearings
44 worm gear shaft
46 Worm gear mount plates
47 apertures
48 Motor
50 Gearbox
52 Shaft insert
54 Limit switch
55 limit switch toggle arm
56 Electronic control module
58 Power data connector
60 capacitor box
62 Stored motor
64 resistor
66 relay
68 timer
70 charging LED
72 bolts
74 threaded apertures
76 counter signal wire

What is claimed is:

1. A motor rotation unit and system comprising:
a motor rotation unit designed to be used on a shaft of a stored electrical motor and comprising a chassis comprising an upper annular portion with a central opening whereby said central opening of the chassis is annular and whereby said chassis has a lower base whereby a worm gear is mounted;
a motor in communication with a gearbox that is mounted onto the base of the chassis whereby said gearbox has a shaft that comes out of the gearbox and drives a worm gear shaft that is integrated into said worm gear such that the worm gear rotates in a circular direction when the motor and gearbox drive the worm gear;
a ring gear mounted to the annular portion of the central opening whereby said ring gear has teeth located along its entire circumference that conform to grooves in the worm gear such that the worm gear rotates the ring gear;
a plurality of roller bearings that are mounted to the annular portion of the chassis that lock the ring gear into the central opening of the chassis and that allow the ring gear to rotate within the central opening through contact with the roller bearings;
a shaft adapter insertable into a rear opening of the ring gear and adapted to be installed onto the shaft of the stored electrical motor and thereby locking the motor rotation unit onto said shaft of the stored electrical motor such that when the motor rotation unit is energized it rotates around the shaft of the stored electrical motor a predetermined distance such that when that distance is achieved the motor rotation unit by reason of its weight will rotate the shaft of the stored electrical motor a certain degree of distance;
a limit switch mounted to the chassis whereby said limit switch has a toggle arm adapted to ride the teeth of the ring gear such that rotation of the ring gear is measured and recorded;
a power source that drives the motor and gearbox;
a capacitor bank located inside a motor rotation unit case that houses the components of the motor rotation unit; and
a control module programmed to control the amount and cycle of power to the motor and gearbox, to record and measure the amount of rotation of the motor rotation unit, and to dictate how frequent a rotation occurs.

2. The motor rotation unit of claim 1, wherein the chassis is made of metal.

3. The motor rotation unit of claim 1, wherein the power source can be a capacitor, a battery, or a wired electrical connection.

4. The motor rotation unit of claim 1, further comprising:
a protective case designed to protect and house the components of the motor rotation unit;
wherein the chassis is made of metal and the metal chassis is mounted to a rear portion of the case; and
a front portion of said case is locked into the rear portion of the protective case.

5. The motor rotation unit of claim 1, wherein a front vertical perpendicular plate and a rear vertical perpendicular plate are mounted to a left side of the chassis;
wherein the front and rear vertical perpendicular plates are configured to attach to the motor and gearbox.

6. The motor rotation unit of claim 1, wherein worm gear mount plates are located in a bottom of a front of the chassis and allow the worm gear and the worm gear shaft to be mounted therein.

7. The motor rotation unit of claim 1, wherein a gearbox shaft and the worm gear shaft are each joined into a shaft insert.

8. The motor rotation unit of claim 1, wherein the annular portion of the chassis has on a left side a portion of a parallel plate for mounting the limit switch.

9. The motor rotation unit and system of claim 1, wherein a rear outer surface of the ring gear has a lip that allows said roller bearings to capture the lip of said ring gear such that the ring gear remains captured within the central opening and is able to rotate within said annular chassis central opening.

10. A motor rotation unit and system, comprising:
a motor rotation unit designed to be used on a shaft of a stored electrical motor, the motor rotation unit comprising:
a chassis, the chassis comprising:
an upper annular portion with an annular central opening; and a lower base;
wherein a worm gear is mounted within the lower base;
a motor in communication with a gearbox that is mounted onto the lower base of the chassis, wherein said gearbox has a shaft that comes out of the gearbox and drives a worm gear shaft that is integrated into said worm gear such that the worm gear rotates in a circular direction when the motor and gearbox drive the worm gear;
a ring gear mounted to the annular portion of the central opening, wherein said ring gear has teeth located along its entire circumference that conform to grooves in the worm gear such that the worm gear rotates the ring gear;
a plurality of roller bearings that are mounted to the annular portion of the chassis, lock the ring gear into the central opening of the chassis, and allow the ring gear to rotate within the central opening through contact with the roller bearings;
a shaft adapter insertable into a rear opening of the ring gear and adapted to be installed onto the shaft of the stored electrical motor in order to lock the motor rotation unit onto said shaft of the stored electrical motor such that when the motor rotation unit is energized, the chassis rotates around the shaft of the stored electrical motor a predetermined distance such that when the chassis moves the predetermined distance a weight of the motor rotation unit rotates the shaft of the stored electrical motor a certain degree of distance;
a limit switch mounted to the chassis whereby said limit switch has a toggle arm adapted to ride the teeth of the ring gear such that rotation of the ring gear is measured and recorded;
a power source that drives the motor and gearbox; and
a control module programmed to control the amount and cycle of power to the motor and gearbox, to record and measure the amount of rotation of the motor rotation unit, and to dictate how frequent a rotation of the motor rotation unit occurs.

11. The motor rotation unit and system of claim 10, wherein the chassis is made of metal.

12. The motor rotation unit and system of claim 11, wherein the power source can be supplied by a capacitor, a battery, or a wired electrical connection.

13. The motor rotation unit and system of claim 12, further comprising:
a case designed to protect and house the components of the motor rotation unit;
wherein the metal chassis is mounted to a rear portion of the case and a front portion of said case is locked into the rear portion of the protective case.

14. The motor rotation unit and system of claim 13, wherein a front vertical perpendicular plate and a rear vertical perpendicular plate are mounted to a left side of the chassis;
wherein the front and rear vertical perpendicular plates are configured to attach to the motor and gearbox.

15. The motor rotation unit and system of claim 14, wherein worm gear mount plates are located in a bottom of a front of the chassis and allow the worm gear to be installed onto a worm gear shaft; and
wherein the worm gear and worm gear shaft are installed between said worm gear plates.

16. The motor rotation unit and system of claim 15, wherein the gearbox has a gearbox shaft; and
wherein the worm gear shaft and gearbox shaft are joined into a shaft insert.

17. The motor rotation unit and system of claim 16, wherein a left side of the annular portion of the chassis has a parallel plate for mounting the limit switch.

18. The motor rotation unit and system of claim 17, wherein a rear outer surface of the ring gear has a lip that allows said roller bearings to capture the lip of said ring gear such that the ring gear remains captured within the central opening and is able rotate within said annular chassis central opening.

19. A motor rotation unit and system comprising;
a chassis having a central opening;
a ring gear having teeth on an outer circumference of said ring gear and said ring gear insertable into said central opening;
a motor and gearbox mounted to the chassis and in communication with a worm gear mounted to a bottom portion of the chassis whereby said worm gear has grooves that align with the teeth of the ring gear and the worm gear rotates the ring gear when driven by the motor;
a plurality of roller bearings mounted into an annular portion of the chassis such that the ring gear is captured in the central opening via the roller bearings and floats and rotates on the roller bearings within the central opening of the annular portion of the chassis;
a shaft adapter inserted into the rear of the central opening of the ring gear and locked into place within said ring gear and said shaft adapter fitting onto on the stored motor shaft;
a limit switch with a toggle arm mounted to the chassis and said toggle arm adapted to ride the teeth of the ring gear such that electronic signals are communicated to a control module that records the degree of rotation of the ring gear and that controls power and duration of power to said motor; and
a power source.

20. A motor rotation unit and system, comprising:
a chassis of a certain weight;
a shaft adapter configured to be installed inside a rear of a central opening of a ring gear of the motor rotation unit, wherein the motor rotation unit is installed, via the shaft adapter, onto a stored motor shaft of a stored motor;
a motor and a gearbox mounted to the chassis to rotate the chassis around the axis of the stored motor shaft;
a control module providing power to the motor;
a power source; and
wherein a weight of the motor rotation unit prevents rotation of the stored motor shaft of the stored motor until the motor rotation unit is actuated and rotates around the stored motor a desired amount characterized by which the weight of the motor rotation unit is sufficient to rotate the stored motor shaft to a 6 o'clock position or a 270 degree position.

21. The motor rotation unit and system of claim 20, further comprising:
a worm gear in rotational contact with the motor and the gearbox;
wherein the worm gear is in rotational contact with the ring gear;

wherein the shaft adapter is installed into said ring gear such that the weight of the chassis can rotate the stored motor shaft a distance once the motor rotation unit moves the desired amount around the stored motor shaft.

22. The motor rotation unit and system of claim 21, wherein the ring gear has teeth on its outer perimeter;
wherein a limit switch is mounted on the chassis and rides the teeth of the ring gear such that a signal is transmitted to the control module to indicate when a pre-determined rotation of the motor rotation unit is achieved; and
wherein the motor rotation unit is then powered down after the pre-determined rotation of the motor rotation unit is achieved.

23. The motor rotation unit and system of claim 22, wherein the control module can control a plurality of motor rotation units attached to stored motors, store motor rotation unit data, and electronically transmit motor rotation unit data remotely.

24. The motor rotation unit and system of claim 20, wherein the motor rotation unit acts as a counterweight to drive a downward rotation of the stored motor shaft.

* * * * *